(12) United States Patent
Chandra

(10) Patent No.: US 10,289,294 B2
(45) Date of Patent: May 14, 2019

(54) CONTENT SELECTION WIDGET FOR VISITORS OF WEB PAGES

(71) Applicant: Rohit Chandra, Sunnyvale, CA (US)

(72) Inventor: Rohit Chandra, Sunnyvale, CA (US)

( * ) Notice: Subject to any disclaimer, the term of this patent is extended or adjusted under 35 U.S.C. 154(b) by 0 days.

(21) Appl. No.: 15/042,977

(22) Filed: Feb. 12, 2016

(65) Prior Publication Data
US 2016/0162173 A1 Jun. 9, 2016

Related U.S. Application Data

(63) Continuation-in-part of application No. 13/831,331, filed on Mar. 14, 2013, now Pat. No. 9,292,617, which is a continuation-in-part of application No. 11/766,786, filed on Jun. 21, 2007, now Pat. No. 8,910,060.

(60) Provisional application No. 60/815,467, filed on Jun. 22, 2006.

(51) Int. Cl.
*G06F 17/00* (2019.01)
*G06F 3/0484* (2013.01)
*H04L 29/08* (2006.01)
*G06F 16/957* (2019.01)

(52) U.S. Cl.
CPC ...... *G06F 3/04847* (2013.01); *G06F 3/04842* (2013.01); *G06F 16/957* (2019.01); *H04L 67/02* (2013.01)

(58) Field of Classification Search
CPC .......... G06F 3/04842; G06F 17/30554; G06F 17/30058
See application file for complete search history.

(56) References Cited

U.S. PATENT DOCUMENTS

| | | |
|---|---|---|
| 5,727,129 A | 3/1998 | Barrett et al. |
| 5,757,371 A | 5/1998 | Oran et al. |
| 5,802,299 A | 9/1998 | Logan et al. |
| 5,958,008 A | 9/1999 | Pogrebisky et al. |
| 5,982,370 A | 11/1999 | Kamper |
| 6,065,057 A | 5/2000 | Rosen et al. |
| 6,088,702 A | 7/2000 | Plantz et al. |
| 6,184,878 B1 | 2/2001 | Alonso et al. |
| 6,199,077 B1 | 3/2001 | Inala et al. |
| 6,240,444 B1 | 5/2001 | Fin et al. |
| 6,260,192 B1 | 7/2001 | Rosin et al. |

(Continued)

*Primary Examiner* — Andrew T McIntosh

(57) ABSTRACT

A method and system for enabling the display of user selected content-portions of internet documents that have been selected by users of a content-portion selection service are disclosed. Accordingly, a content-portion selection service includes a web portal with a web page providing users with a snippet of code, which, when inserted into an internet document, causes the internet document to display selected content-portions from the content-portion selection service. The snippet of code can be configured to query the content-portion selection service for selected content-portions that were made by certain users, or, selection content-portions made on documents from certain domains, and so forth. The code associated with the user interface object displaying the selected content-portions can be configured to periodically query the content-portion selection service to retrieve up-to-date content-portion selections, thereby dynamically changing the content-portions appearing on a web page or internet document.

20 Claims, 14 Drawing Sheets

(56) References Cited

U.S. PATENT DOCUMENTS

| | | |
|---|---|---|
| 6,282,548 B1 | 8/2001 | Burner et al. |
| 6,338,117 B1 | 1/2002 | Challenger et al. |
| 6,339,767 B1 | 1/2002 | Rivette et al. |
| 6,456,304 B1 | 9/2002 | Angiulo et al. |
| 6,490,602 B1 | 12/2002 | Kraemer |
| 6,493,733 B1 | 12/2002 | Pollack et al. |
| 6,563,913 B1 | 5/2003 | Kahhazian |
| 6,600,503 B2 | 7/2003 | Stautner et al. |
| 6,711,585 B1 | 2/2004 | Copperman et al. |
| 6,769,015 B1 | 7/2004 | Bates et al. |
| 6,850,986 B1 | 2/2005 | Peacock |
| 7,269,787 B2 | 9/2007 | Amitay et al. |
| 7,284,008 B2 | 10/2007 | Henkin et al. |
| 7,315,848 B2 | 1/2008 | Pearse et al. |
| 7,506,253 B2 | 3/2009 | Armstrong |
| 7,519,562 B1 | 4/2009 | Vander Mey et al. |
| 7,533,090 B2 | 5/2009 | Agarwal et al. |
| 7,539,656 B2 | 5/2009 | Fratkina et al. |
| 7,603,437 B2 | 10/2009 | Busey |
| 7,693,817 B2 | 4/2010 | Dumais et al. |
| 7,702,811 B2 | 4/2010 | Gopalan et al. |
| 7,925,993 B2 | 4/2011 | Williams |
| 7,941,444 B2 | 5/2011 | Cragun et al. |
| 7,996,396 B2 | 8/2011 | Leblang et al. |
| 8,090,706 B2 | 1/2012 | Bharat |
| 8,131,779 B2 | 3/2012 | Jonker et al. |
| 8,150,824 B2 | 4/2012 | Marmaros et al. |
| 8,195,772 B2 | 6/2012 | Marmor |
| 8,276,061 B2 | 9/2012 | Joshi et al. |
| 8,631,001 B2 | 1/2014 | Lawrence et al. |
| 2001/0000537 A1 | 4/2001 | Inala et al. |
| 2001/0044720 A1 | 11/2001 | Lee et al. |
| 2001/0051987 A1 | 12/2001 | Fukumoto et al. |
| 2002/0007379 A1 | 1/2002 | Wang et al. |
| 2002/0023072 A1 | 2/2002 | Stern et al. |
| 2002/0049738 A1 | 4/2002 | Epstein |
| 2002/0059343 A1 | 5/2002 | Kurishima et al. |
| 2002/0059369 A1 | 5/2002 | Kern et al. |
| 2002/0065802 A1 | 5/2002 | Uchiyama |
| 2002/0069296 A1 | 6/2002 | Aua et al. |
| 2002/0076053 A1 | 6/2002 | Hachimura |
| 2002/0129375 A1 | 9/2002 | Kim et al. |
| 2003/0025731 A1 | 2/2003 | Chastain et al. |
| 2003/0050927 A1 | 3/2003 | Hussam |
| 2003/0081000 A1 | 5/2003 | Watanabe |
| 2003/0187886 A1 | 10/2003 | Hull et al. |
| 2004/0205065 A1 | 10/2004 | Petras et al. |
| 2004/0205541 A1 | 10/2004 | D'Amico |
| 2004/0225716 A1 | 11/2004 | Shamir et al. |
| 2005/0010475 A1 | 1/2005 | Perkowski et al. |
| 2005/0086634 A1 | 4/2005 | Bates et al. |
| 2005/0091027 A1 | 5/2005 | Zaher et al. |
| 2005/0160167 A1 | 7/2005 | Cheng et al. |
| 2005/0210393 A1 | 9/2005 | Maeng |
| 2005/0256866 A1 | 11/2005 | Lu et al. |
| 2006/0004711 A1 | 1/2006 | Naam |
| 2006/0004734 A1 | 1/2006 | Malkin et al. |
| 2006/0036565 A1 | 2/2006 | Bruecken |
| 2006/0041625 A1 | 2/2006 | Chen et al. |
| 2006/0048046 A1 | 3/2006 | Joshi et al. |
| 2006/0053365 A1 | 3/2006 | Hollander et al. |
| 2006/0136451 A1 | 6/2006 | Denissov |
| 2006/0143236 A1 | 6/2006 | Wu |
| 2006/0274086 A1* | 12/2006 | Forstall .................. G06F 9/543 |
| | | 345/629 |
| 2006/0282336 A1 | 12/2006 | Huang |
| 2006/0282795 A1 | 12/2006 | Clark et al. |
| 2006/0287971 A1 | 12/2006 | Armstrong |
| 2007/0055926 A1 | 3/2007 | Christiansen et al. |
| 2007/0143345 A1 | 6/2007 | Jones et al. |
| 2007/0192314 A1 | 8/2007 | Heggem |
| 2007/0234209 A1 | 10/2007 | Williams |
| 2007/0250582 A1 | 10/2007 | Sidhu et al. |
| 2007/0266342 A1* | 11/2007 | Chang ............... G06F 17/30867 |
| | | 715/810 |
| 2008/0016169 A1 | 1/2008 | Kaghazian |

* cited by examiner

Stocks tumble amid concerns over technology

Dow records biggest one-day drop since Nov. 27; economic worry weighs

NEW YORK - Wall Street tumbled Monday, as growing concerns over technology companies led jittery investors to pull money out of the market ahead of this week's earnings reports.

The market has been vulnerable to erratic trading lately, with investors cautious about the direction of the economy and companies' results. The tech sector so far has been knocked down the most, after Apple Inc.'s and Intel Corp.'s outlooks last week fell below the Street's expectations.

With industry leaders like Qualcomm Inc. and Microsoft Corp. releasing their financial results later this week, many investors are bracing for disappointment.

"The market is nervous," said Joe Ranieri, managing director in equity trading at Canaccord Adams. "We've had a few good quarters in a row in tech land. The problem with having good quarters is, it gets harder and harder to impress."

Blue chip stocks were also dragged down by a Wachovia analyst's downgrade of Boeing Co., the analyst cited possible aircraft order delays from the jet maker.

Overall, earnings reports and economic data this year have signaled growth that's cooling, but not

FIG. 7

```
┌─────────────────────────────────────────────────────────┐
│ FILE  EDIT  VIEW  BOOKMARKS  TOOLS  HELP                │
│  ←  ⊗ ⟳ ⌂  [HTTP://myblog.com            ]              │
│ →                                                        │
│                     MyBlog.com                           │
│ ─────────────────────────────────────────────────────── │
│  FRIDAY, MAY 19, 2007                  BLOG ARCHIVE     │
│                                                          │
│  TODAY's MARKET OVERVIEW                 ▽ 2007         │
│                                            ▽ MAY (1)    │
│  Stocks picked up where they left off      ▽ APRIL (7)  │
│  last Friday, catching a bid on another                 │
│  round of M&A activity.                                 │
│                                                          │
│  Per usual, the first day of the        WHAT OTHERS ARE │
│  trading week was packed with more      SAYING:          │
│  deal-making news, lending further      ┌──────────────┐│
│  evidence that the financial markets    │JANE DOE'S    ││
│  continue to draw strength from the     │HIGHLIGHTS:   ││
│  liquidity factor.                      │  With indus- ││
│                                         │try leaders   ││
│  The day's biggest headline involved    │like Qualcomm ││
│  news that a consortium led by the      │Inc. and Mi-  ││
│  Royal Bank of Scotland sweetened its   │crosoft Corp. ││
│  bid for ABN Amro (ABN 47.03 -0.29) to  │releasing     ││
│  $95.5 bln. That represented a 13.7%    │their finan-  ││
│  premium to the offer made by Barclays  │cial results  ││
│  (BCS 57.98 +0.63).                     │later this    ││
│                                         │week, many    ││
│                                         │investors are ││
│                                         │bracing for   ││
│                                         │disappointment││
│                                         └──────────────┘│
│                                                  126     │
└─────────────────────────────────────────────────────────┘
```

FIG. 14

CONTENT SELECTION WIDGET FOR VISITORS OF WEB PAGES

RELATED APPLICATIONS

The present application is a continuation-in-part of U.S. patent application Ser. No. 13/831,331 filed on Mar. 14, 2013. U.S. patent application Ser. No. 13/831,331 claims the benefit of Ser. No. 11/766,786 filed on Jun. 21, 2007. U.S. patent application Ser. No. 11/766,786 claims the benefit of U.S. Provisional Patent Application with Ser. No. 60/815,467 filed on Jun. 22, 2006. Further Ser. No. 11/766,786 incorporated U.S. patent application Ser. No. 11/766,669, the contents of all of these applications are hereby incorporated herewith.

FIELD

The present invention relates generally to computer network-based information retrieval techniques. More particularly, the present invention relates to methods and systems that enable a user to mark-up or select content-portions of information (such as text or images) on an internet document for better visibility, later retrieval and/or sharing with one or more other users.

BACKGROUND

A wealth of information is available on the Internet, and particularly that segment of the Internet referred to generally as the World Wide Web. However, despite vast improvements in search engines, finding the particular information that one is interested in can still be a challenging and time-consuming task. Perhaps even more frustrating is the lack of tools available to enable a user to retrieve previously searched for and discovered information. In the realm of search and retrieval, search engines aid in the search but leave much to be desired when it comes to information retrieval.

One common mechanism used for information retrieval is referred to generally as a bookmark. A bookmark is a mechanism or function enabling a user to save a copy of a uniform resource locator (URL). For example, if a user finds an article of interest at URL, www.interesting-article.com/article_12345.htm, (with or without a web protocol such as http://, https:// etc. being specified), the user can save the URL as a bookmark so that at a later time the user can simply select (e.g., with a mouse or other pointing device) the bookmark to reload the document associated with the URL. The user might choose to categorize the bookmarks. Traditionally, bookmarks have been facilitated by a web browser application and stored at the computer on which the web browser application resides. However, more recently online bookmarking services have provided users with a way to store bookmarks online, making the bookmarks accessible from any network-connected computer.

As a means of information retrieval, bookmarks have several shortcomings. One problem with bookmarks is they provide little, if any, explanation or context as to what it is about the associated document that may be significant. For instance, a bookmark simply associates a URL with a document. A user may generate a bookmark for a particular web page because of a single passage in an article, or a particular blog entry on a web page with many blog entries. When the user retrieves the web page at a later time by means of selecting the bookmark, the user may not be able to remember what it is that is significant about the web page and why he or she saved the bookmark in the beginning.

Another problem with bookmarks is that they become stale, and in some cases expire, over time. For instance, an internet document may change between the time that a user generates a bookmark, and then revisits the associated web page at a later time. In some cases, a URL, may expire altogether. For example, the document associated with the URL may be removed from the server such that the URL returns an error message indicating the document no longer exists.

Another problem with bookmarks is they are a less than ideal mechanism for sharing information. For example, to share information with a bookmark facilitated by a web browser application, a user must generally email the bookmark to another user. When the recipient receives the email including the bookmark, the user must select the link—if the bookmark is implemented as a user-selectable link—in order to initiate loading of the associated document in the user's web browser application. Often the bookmark is not a user-selectable link. In this case, the user must copy-and-paste, or type, the corresponding URL of the bookmark into the address bar of the web browser application. The copy-and-paste method sometimes does not work because of special characters, such as carriage return and line feed characters, in the URL. In any case, the additional steps required to access the relevant document are often viewed as burdensome. Often it is only a subset of individuals who end up going through the process necessary to load the relevant document. When the relevant document is finally loaded into and displayed by the recipient's web browser, the recipient of the bookmark may not appreciate the relevance of the associated document.

Realizing that many email recipients will not follow embedded links, some senders have devised a strategy wherein they copy-paste the relevant portions of an internet document into the body of an email. However, this simply shifts the copy-paste workload from the recipient to the sender. Furthermore, on the receiving end, the context is lost and credibility is in doubt as to the authenticity of the pasted material with respect to the original content. Thus, improved tools for information retrieval and collaboration are needed.

SUMMARY

A method, apparatus and system for enabling a user to select one or more content-portions in a currently displayed internet document in a web browser are disclosed. The user-selected content-portions are persistent over user-initiated cursor control activities as well as persistent over web browsing sessions. Further, the display and sharing of the user-selected content-portions of internet documents are disclosed. Accordingly, a content-portion selection service includes a web page providing users with a mechanism: such as a snippet of code, which, when inserted into a second internet document, causes the second internet document to display previously made content-portion selections and/or comments. The snippet of code can be configured to query the content-portion selection service for selections that were made by certain users, or, selections made on documents from certain domains, and so forth. The code associated with the user interface object displaying the content-portion selections can be configured to periodically query the content-portion selection service to retrieve up-to-date selections, thereby dynamically changing the user selected content-portions appearing on a web page or internet document. Furthermore, the content-portion selection functionality can be invoked without downloading and installing any custom software components, and without explicitly generating a user account.

Other aspects of the invention are described below in connection with the description of the figures.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 7 illustrates an example of a user interface object, referred to herein as a content-portion selection toolbar, which enables a user to, among other things, select portions of content and objects on an internet document, according to an embodiment of the invention;

FIG. 14 illustrates an example of a web page with a user interface object referred to herein as a content-portion selections roll, according to an embodiment of the invention.

DETAILED DESCRIPTION

Figure 1:
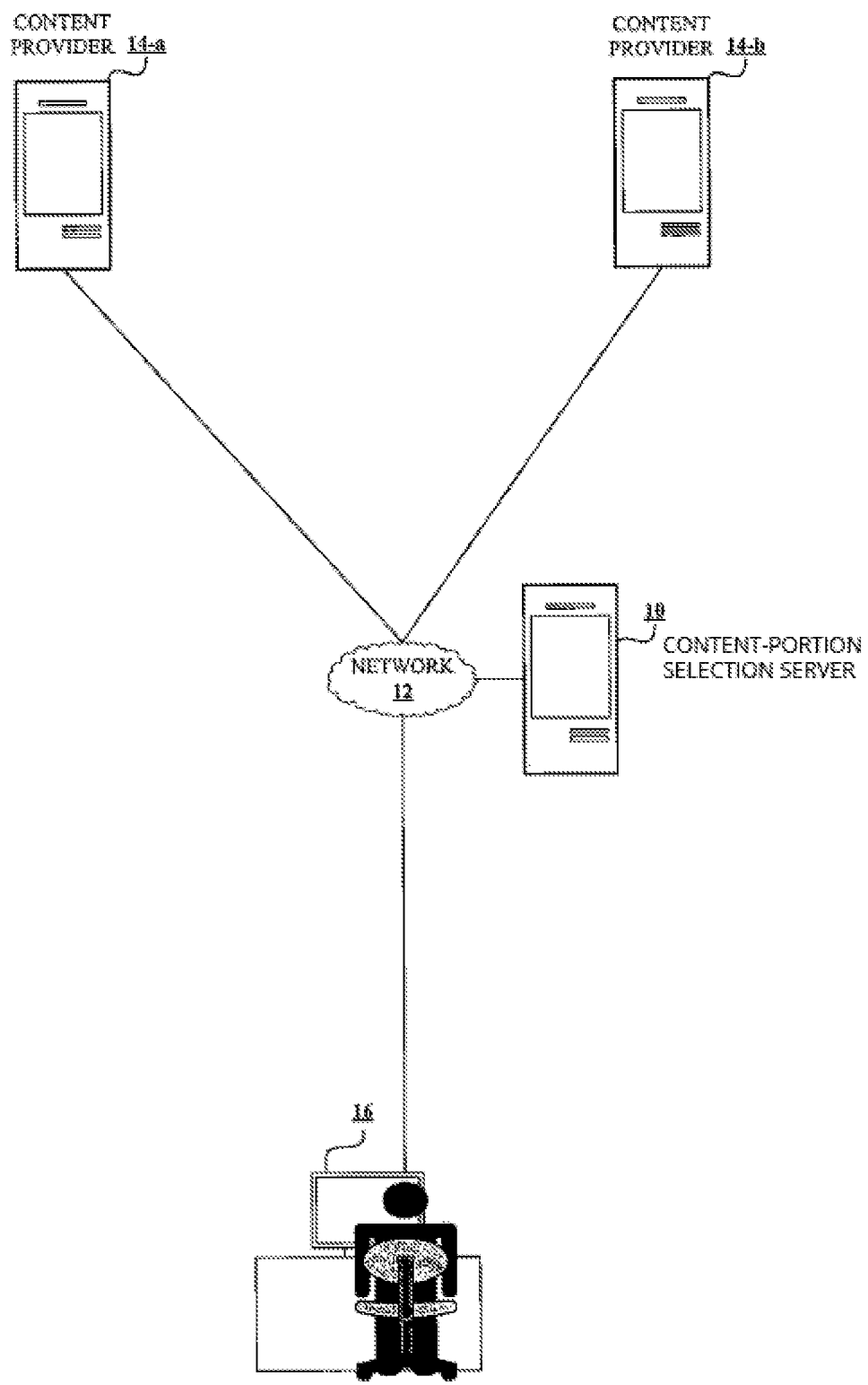
FIG. 1 illustrates an example of a computer network environment including a content-portion selection server, according to an embodiment of the invention.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description. In particular, many of the various aspects and features of the invention are most easily understood by those skilled in the art when conveyed as user interface features. However, those skilled in the art will appreciate that the user interface elements illustrated and described are examples, and the invention is not to be limited by those user interface features specifically illustrated in the drawings.

Consistent with one embodiment of the invention, a content-portion selection service is provided by a content-portion selection server, which enables a user to manipulate the user interface of a web browser application executing at the user's client device to select portions of content of an internet document received from a content provider's server. In so doing, any portions of content selected by the user are captured by the content-portion selection server. For example, the portion of content selected by the user is communicated to the content-portion selection server, where it is stored. Accordingly, the content-portion selection server enables a user to easily retrieve the selected portion of content at a later time. In addition, the content-portion selection server enables a user to annotate and share the selected portion of content with, or without, the internet document, with other users.

The content-portion selection server enables a user to select portions of content via a conventional web browser interface, for example, by controlling a customizable cursor with a pointing device (e.g., a mouse, trackball, joystick etc.). The manner in which the user manipulates the user interface to select portions of content is similar to the way in which a user would select portions of content in any number of conventional editing applications. For example, the user may simply press and hold a button of a pointing device while manipulating a cursor with the pointing device to select a particular portion of content. However, in accordance with an embodiment of the invention and in contrast to conventional editing applications, the content-portion selection server enables a user to select the content-portion of internet documents served from a content provider server with the conventional controls and features of a web browsing application, without installing any special software. Moreover, any content-portions selected by the user are communicated in near-real-time to the content-portion selection server without any need for any additional user interaction. Consequently, any content-portions the user selects are automatically saved at the content-portion selection server and can easily be viewed during a subsequent web browsing session. In an alternative embodiment of the invention, the content-portions could be saved on a local device.

In addition to enabling a user to easily retrieve selected portions of content of internet documents, the content-portion selection server facilitates various methods of sharing selected portions of content with other users. For instance, in one embodiment, after a first user has selected a content-portion from a particular internet document, a subsequent user viewing the same document with the content-portion selection service invoked will optionally be able to see the first user's selection(s). Similarly, if multiple users previously selected content-portions from a particular document, a subsequent user will be able to see all user's selections. To avoid becoming overwhelmed with selections, a user, and/or the system, can configure the settings of the content-portion selection service such that only content-portion selections made by user-selected persons (including oneself), or those persons who are a member of a user-selected and/or system-selected group, are displayed. In yet another aspect, a user may generate and send a message to another user such that the message includes the selected portions of content and/or the entire document as selected.

It will be appreciated by those skilled in the art that various architectures may be used to implement a content-portion selection service consistent with the invention described herein. Furthermore, although many functions described herein are attributed to either a client or a server, those skilled in the art will appreciate that in alternative embodiments of the invention, a function attributed herein to a server, may in fact be implemented on, or provided by a client device. Similarly, a function described herein as being provided by a client, may be provided by a server in an alternative embodiment of the invention. Other aspects of the invention will become apparent from the descriptions of the drawings that follow.

Although the present invention is described herein primarily in the context of a content-portion selection service, those skilled in the art will recognize a wide variety of other applications that are consistent with the general spirit of the invention. For instance, consistent with another embodiment of the invention, a client web browser directs a request for a document (either directly, or indirectly) to a content provider hosting the document. The request may be directed to an intermediate server or intercepted by an intermediate server, which in turn, forwards the document request on to the content provider server. The content provider server sends the requested internet document to the intermediate server where it is modified in some manner "on the fly". That is, the requested internet document is modified by the intermediate server in near real time, before it is forwarded on to the requesting client web browser. Accordingly, the requesting client web browser receives a modified copy of the requested document, without making any actual modification to the document stored on the content provider server. In an alternative embodiment of the invention, the requested document is communicated from the intermediate server to the client web browser in its original unmodified form, along with a code module. At the client web browser, the code module is executed or interpreted, causing the client to modify the original document in some manner.

The modification to the document made by the intermediate server in near real time (or the client) may include overlaying an object on the document, changing a portion of the document, altering the references in a document, adding an additional element or component to the internet document, or alternatively, removing or deleting a portion or element of the originally requested document. For example, in one embodiment of the invention, a portion of the document may be selected. In another embodiment of the invention, an advertisement may be added or deleted from the originally requested document. In yet another embodiment of the invention, a textual portion of the document may be italicized, underlined, made bold, or have its color changed. In any case, the document is being modified by the intermediate server.

System Architecture

FIG. 1 illustrates an example of a computer network environment including a content-portion selection server 10, according to an embodiment of the invention. As illustrated in FIG. 1, the content-portion selection server 10 is communicatively coupled by means of a network 12 to several content provider servers (e.g., 14-*a* and 14-*b*). In addition, the content-portion selection server 10 is communicatively coupled by means of a network 12 to a user's client computer 16. It will be appreciated by those skilled in the art that the computing environment illustrated in FIG. 1 is but one example, and a wide variety of computer and network configurations might be used without departing from the spirit of the invention. For instance, the user computer, although depicted in FIG. 1 as a desktop computer, may be any of a wide variety of computing devices, including but not limited to: desktop computer, laptop computer, personal digital assistant, e-book reader, or mobile handset. Furthermore, although in the examples provided herein the content-portion selection server 10 is shown as a separate component, in one embodiment of the invention the content-portion selection service executing on the content-portion selection server 10 may reside and execute on a content provider server (e.g., 14-*a*, or 14-*b*), or a server under the control of a content provider.

In general, the user utilizes a web browser application on client computer 16 to access and display content in the form of internet documents or web pages, which are stored in whole or in part on various content providers (e.g., 14-*a* and 14-*b*). In one embodiment of the invention, a user invokes the content-portion selection service by prepending the address or uniform resource locator (URL) of the content-portion selection server 10 prior to the URL of an internet document that the user is requesting. In one embodiment of the invention, a bookmarklet, which is a button with associated code that typically resides on a web browser toolbar, automatically prepends the address of the content-portion selection server to the address of a document, thereby invoking the content-portion selection service.

Consistent with an embodiment of the invention, once a content-portion selection session has been invoked, a user has at his or her disposal a variety of tools for content-portion selection of an internet document. For instance, in one embodiment of the invention, a content-portion selection tool panel will appear in the web browser window and provide the user with a selection of controls enabling various features and functions of the content-portion selection service. In another embodiment of the invention, various controls may be provided by a content-portion selection toolbar. In any case, the basic function of the content-portion selection service is to enable a user to select a portion of content (e.g., text, graphical images, etc.) of an internet document, such that the selected portion(s) can easily be recalled at a later time and/or shared with other users. Accordingly, as the user selects an object, the selected object is communicated to the content-portion selection server 10 where it is stored. In one embodiment of the invention, the selected object (e.g., a selection of text, or image etc.) is stored along with any annotations or comments the user may have added, as well as a date and time indicating when the content-portion was selected. The selected object and its associated data are stored in such a manner as to be associated with the user who selected the content-portion. This allows the user to recall and view content-portions from previous content-portion selection sessions. Furthermore, as each content-portion is associated with a source (e.g., a person responsible for selecting the content-portion), users can configure the content-portion selection service to display content-portions on a per user basis. That is, a user may configure the settings of the content-portion selection service to display only the selections of a particular user, or group of users. For instance, as described in greater detail below, users may create and subscribe to groups. Accordingly, a user may configure the content-portion selection service to display content-portions on a per group basis, such that only content-portion selections from those members of a particular group are displayed. Similarly, an embodiment of the invention may enable a user to build out a social network, for example, by specifying who the user considers to be direct contacts. Accordingly, the user may configure the content-portion selection service to display content-portion selections of all users within the user's social network, up to a certain degree of separation (e.g., a friend of a friend).

The content-portion selection service enables the user to select content-portions with conventional web browser controls. For example, in one embodiment of the invention, the user selects a content-portion by simply pressing a button of a cursor control device (e.g., mouse) and dragging the cursor across an object before letting up on the button. The content-portions selected by a user, according to an embodiment of the invention, are persistent over user-initiated cursor activity as well as web browsing sessions. That is, after selecting a content-portion, each user selection remains selected even after the user clicks on a different portion of the internet document. Similarly, a user can navigate away from an internet document or web page on which the user has selected a content-portion, and the next time the user revisits the web page, the content-portion selection will be visible so long as the user has invoked a content-portion selection session via the content-portion selection service.

In one embodiment of the invention, the content-portion selection service is enabled without requiring the user to download and install a client-side software application. That is, the content-portion selection service is enabled via the standard functions of the web browser application on the client side. For instance, in one embodiment of the invention, asynchronous JavaScript and extensible markup language (XML), referred to as Ajax, are used to provide an interactive user experience via a conventional web browser application, without the need for downloading and installing any customized software. Alternatively, the content-portion selection service may be enabled by a browser plug-in or browser extension. For instance, a user may download and install a software application that when executed, works in conjunction with a web browser application to enhance the functionality of the web browser application—in this case, enabling the content-portion selection service. In yet another embodiment, the content-portion selection service may be enabled by a stand alone software application. That is, the client side functionality of the content-portion selection service may be attributed to a daemon, or some other stand alone software application.

Figure 2:
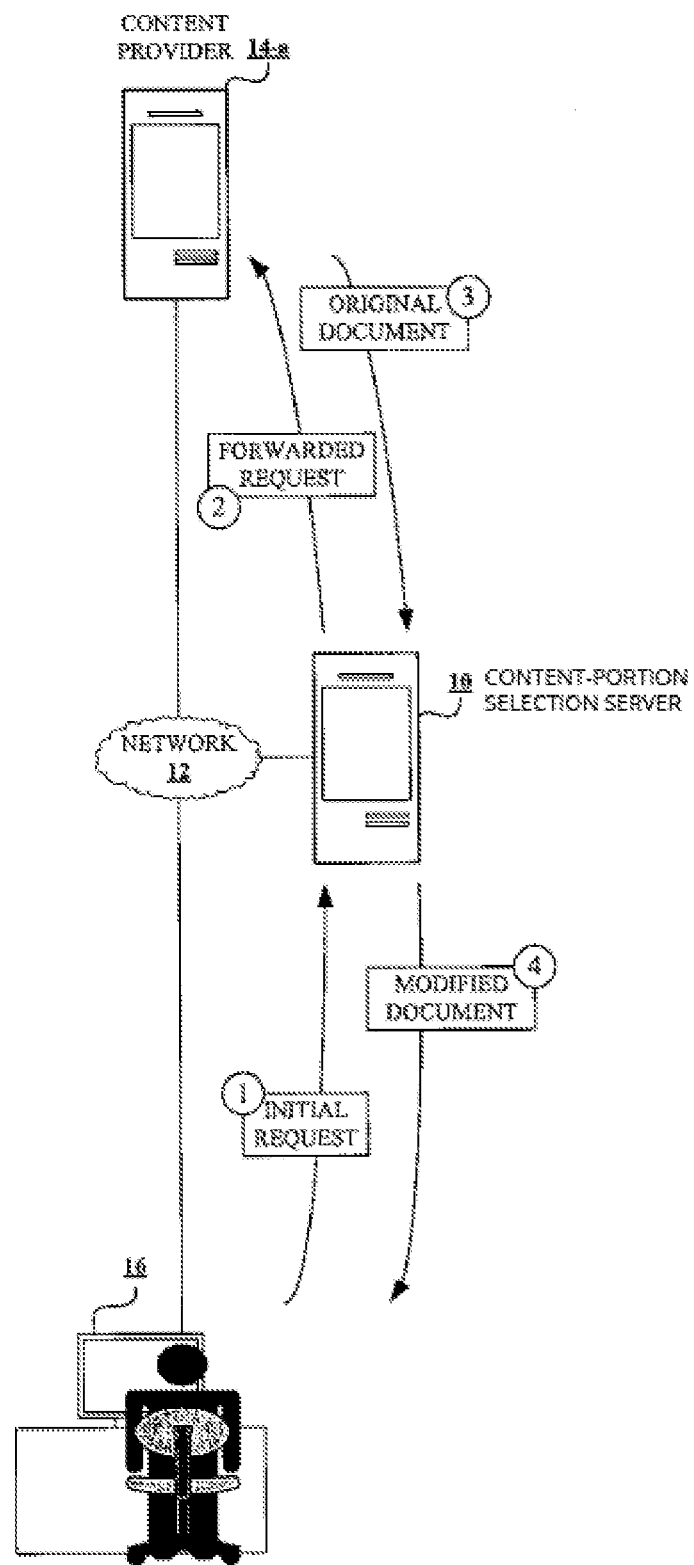
FIGS. 2 and 3 illustrate data flow diagrams showing an example of the data flow between an end-user's computing device, a content-portion selection server, and a content provider according to an embodiment of the invention.
Figure 3:
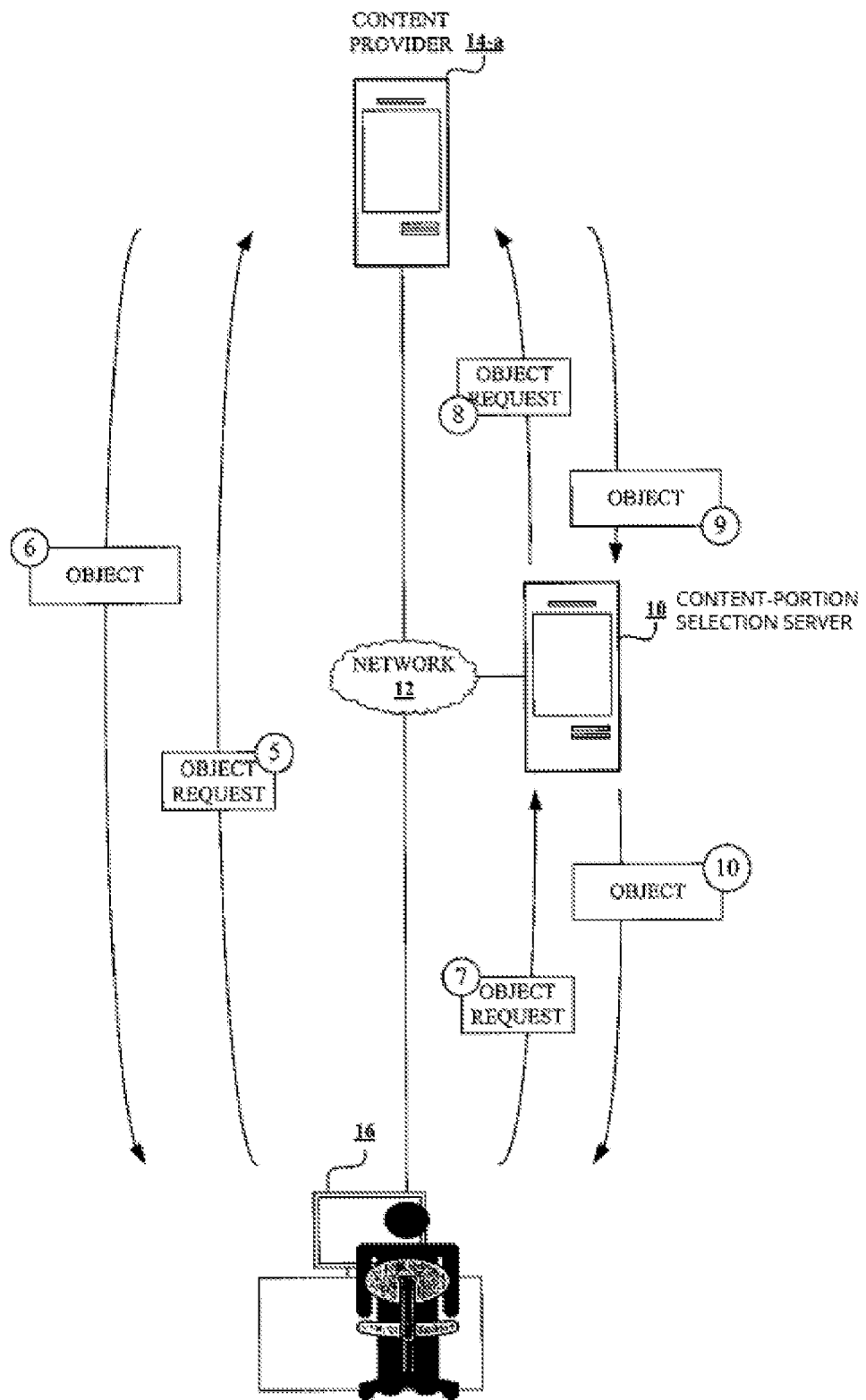

FIGS. 2 and 3 illustrate a data flow diagram showing an example of the data flow between an end-user's computing device, a content-portion selection server, and a content provider according to an embodiment of the invention. As illustrated in FIG. 2, a content-portion selection session is invoked when, at step 1, a user directs an initial request via the user's web browser application to the content-portion selection service hosted by the content-portion selection server 10. The initial request, although directed to the content-portion selection server 10, includes the address of a desired internet document. For instance, the address of the content-portion selection server 10 may be prepended to the beginning of the address of the requested document such that the request is sent to the content-portion selection server 10, but includes the address of the desired document hosted at the content provider 14-a. For instance, such a request may be of the form: "roohit.com/http://www.news.com/article123.htm" (with or without a web protocol such as http://, https:// etc. being specified).

Once the content-portion selection server 10 receives the initial request, the content-portion selection server 10 analyzes the initial request and extracts the address of the requested document. For example, the address extraction logic 22 (shown in FIG. 4) extracts the address of the requested internet document (e.g., "www.news.com/article123.htm") from the request received by the content-portion selection server 10 (e.g., "roohit.com/http://www.news.com/article123.htm" with or without a web protocol such as http://, https:// etc. being specified). Accordingly, at step 2, the forwarding logic 22 (shown in FIG. 4) of the content-portion selection server 10 forwards the document request to the content provider that is hosting the requested document. At step 3, the content provider responds by communicating the original requested document to the content-portion selection server 10.

Once the content-portion selection server 10 receives the original document from the content provider, the content-portion selection server 10 analyzes the original document and modifies various object references within the original document. For instance, in one embodiment of the invention, the content-portion selection server 10 includes reference modification logic 24 for modifying various references by prepending the content-portion selection server address to the existing addresses in the reference. Consequently, when an object is requested, the web browser application will direct a request to the content-portion selection server 10 for those objects with modified references. Finally, at step 4, the modified document is communicated from the content-portion selection server 10 to the client computer 16.

As illustrated in FIG. 3, when the client computer 16 receives the modified document, it attempts to request the various objects that are referenced in the document. Accordingly, at step 5, for those objects stored directly at the content provider, the client computer 16 sends object requests to the content provider 14-a. Requests sent directly to the content provider 14-a are serviced by the content provider 14-a, and at step 6 one or more objects are returned to the client computer 16. For those objects which have had their reference previously modified (e.g., by prepending the address of the content-portion selection server), the client computer directs one or more object requests to the content-portion selection service (e.g., at step 7). In turn, at step 8, the content-portion selection server 10 communicates a request for the object to the content provider 14-a. The content provider communicates the object to the content-portion selection server at step 9, and finally, at step 10 the object is communicated to the client computer 16 which displays the internet document in a web browser window.

Referring again to FIG. 2, if a user requests a document that has previously had content-portions selected (e.g., by the requesting user, or another user), the content-portion selection server 10 will modify the original document by inserting the necessary object reference to ensure that the previously selected content-portion(s) are displayed as being selected when the document is rendered by the user's web browser application. For instance, the reference modification logic 24 of the content-portion selection server 10 will modify the object reference in the original document, such that the modified object reference will cause the particular object (e.g., selection of text, or image) to be visibly selected when displayed by the web browser application. In another embodiment of the invention, a portion of executable or interpretable code sent from the content-portion selection server 10 to the client enables the client to query the content-portion selection server 10. Accordingly, the query is processed by the content-portion selection service, and if a particular document has previously had content-portions selected, the necessary data is sent to the client's web browser application to visibly show the selected content-portions. In one embodiment of the invention, the query indicates the URL of the currently displayed document. The content-portion selection service determines whether the URL is associated with any previously selected content-portions. If so, the content-portion selection service determines if the current user (e.g., the user viewing the document) has configured the content-portion filtering mechanisms to display any of the previously selected content-portions. If the user has optionally selected to view content-portions from one or more users who have previously selected a content-portion on the currently displayed page, then the content-portion selection service will communicate the appropriate information to the client so that those content-portion(s) will be displayed as selected.

Figure 4:
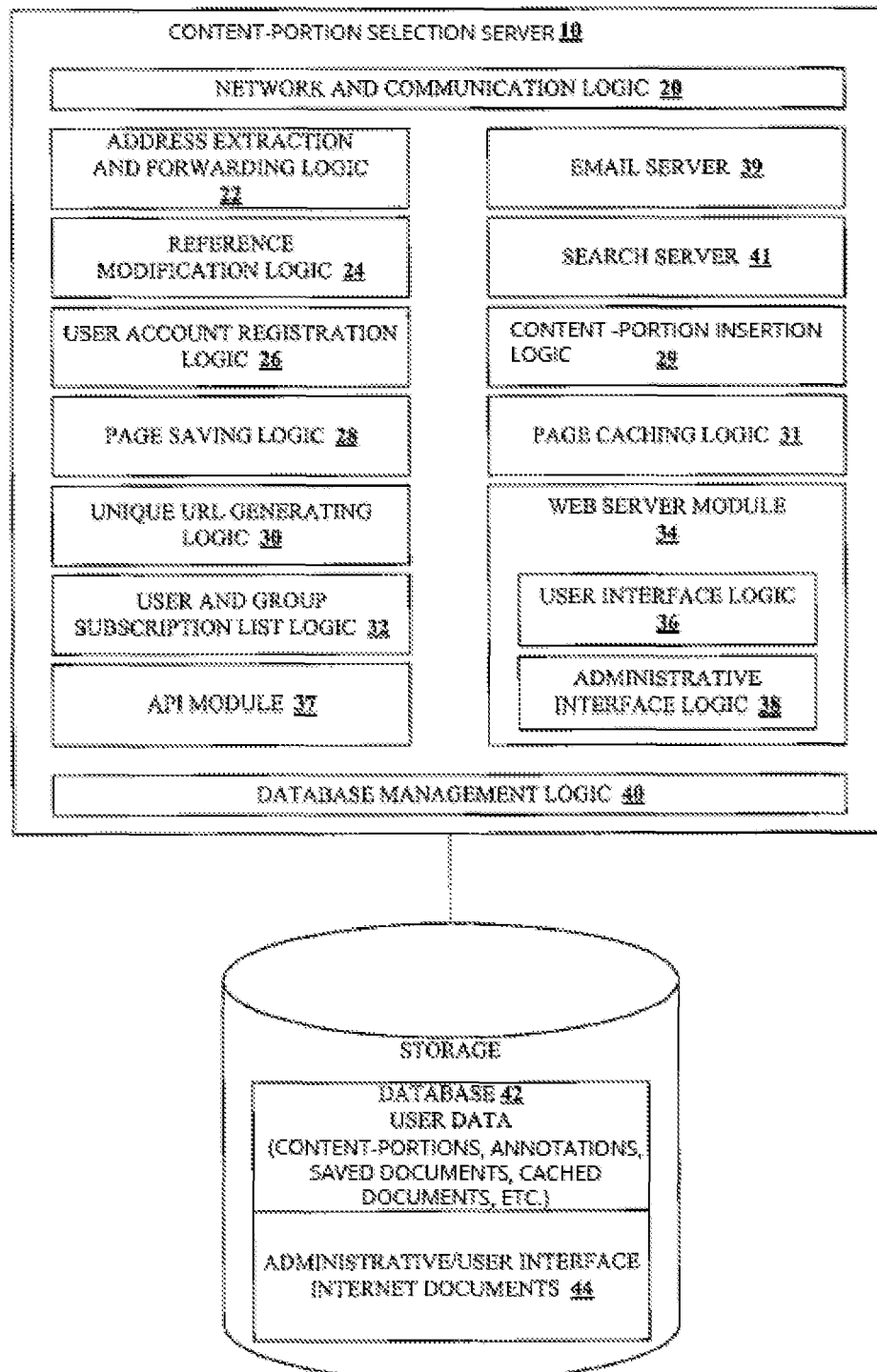
FIG. 4 illustrates a logical block diagram showing an example of the logical components of a content-portion selection server according to an embodiment of the invention.

FIG. 4 illustrates a logical block diagram showing an example of the logical components of a content-portion selection server 10 according to an embodiment of the invention. As illustrated in FIG. 4, the content-portion selection server 10 includes network and communications logic 20 for communicating data with various other computing devices, including client computers and content provider servers. In one embodiment of the invention, the network and communication logic 20 implements the necessary network and communication protocols, such as transfer control protocol and the internet protocol (TCP/IP) for sending and receiving data over a network, such as the public Internet. A variety of other well known communication and networking protocols may be used in accordance with an embodiment of the invention.

In one embodiment of the invention, the content-portion selection server 10 includes address extraction and forwarding logic 22 as well as reference modification logic 24. As described above, when the content-portion selection server 10 receives a request for a document hosted by another content provider, the address extraction and forwarding logic 22 extracts the document address of the requested document from the initial request received at the content-portion selection server 10, and then forwards the extracted document address to the proper content provider 14. Similarly, the reference modification logic 24 modifies object references in original documents received from content provider servers prior to sending the object references in the modified document to the client computer. Object references are modified, for example, to ensure that certain object requests are directed to the content-portion selection server, and other requests are directed directly to the content provider.

In one embodiment of the invention, the content-portion selection server 10 includes page caching logic 31. Accordingly, when a client requests a document hosted at a content provider, the content-portion selection server 10 may check its cache to determine if the content-portion selection server 10 has a current copy of the document stored locally. If so, the content-portion selection server 10 does not need to forward the request to the content provider, but instead, the content-portion selection server 10 can retrieve and serve the document from its cache.

In one embodiment of the invention, the content-portion selection server 10 includes user account registration logic 26. As described in greater detail below, in one embodiment of the invention, a user can access and use the content-portion selection service in one of two modes—as a registered user, or as an unregistered user. As an unregistered user, the user is not prompted to enter or provide any personal information or set-up a username and/or password. The content-portion selection service allows unregistered users to save and share content-portions. However, if an unregistered user would like to become a registered user, the user account registration logic 26 facilitates the generation of a user account while preserving all previously selected content-portions. That is, the content-portion service will merge an unregistered user's data into a registered account, thereby preserving any configuration settings and content-portions the user made as an unregistered user.

In one embodiment of the invention, the content-portion selection server 10 includes page saving logic 28 and unique URL generating logic 30. In certain situations, a user may desire to save a copy of an internet document. For instance, many internet documents—such as web pages on news sites, and blogs—are dynamic and constantly changing. Accordingly, a user may want to select a portion of content of an internet document and then save a copy of the entire page, for example, to share with another user or group of users. The page saving logic 28 enables a user to save a copy of an entire page. The unique URL generating logic 30 generates a unique URL to associate with the saved page. Therefore, to share an internet document that has been saved by the content-portion selection service, a user can share the unique URL generated by the unique URL generating logic 30 and associated with the saved page.

When a content-portion selection is made on a page that tends to be dynamic (e.g., changes frequently)—for example, such as a blog site, or a news site—content-portion insertion logic 29 analyzes the content of the page to determine if, and where, a previously selected content-portion is to be inserted. For example, as new blog entries are posted to a blog site, thereby forcing old entries to appear positioned lower on the web page, the content-portion insertion logic 29 intelligently analyzes the web page to determine where to position a previously selected content-portion.

In one embodiment of the invention, users can display and view content-portions selected on a per user and/or a per group basis. Accordingly, the content-portion selection server 10 includes user and group subscription logic 32 to manage the creation of, and subscription to, user, as well as system-defined groups. For instance, a web-based interface to the content-portion selection service may provide a user with an option to create a group, and invite others to join the group. Similarly, a user may search for and join previously created groups. The group subscription logic 32 facilitates and manages such tasks. Once a member has subscribed to a particular group, the member can configure the content-portion selection service to display content-portion selections from all members of the group. In one embodiment, a user may subscribe to receive emails embedded with new content-portion selections from users in a particular group. Accordingly, the user may subscribe to receive emails on a real-time basis showing all new selected content-portions as they are made by users. Alternatively, a user may subscribe to receive a daily, weekly, or some other time period, email summary, or message summary showing relevant content-portions selected for that time period.

In one embodiment of the invention, the content-portion selection server 10 includes a web server module 34. The web server module 34 not only serves documents that have been forwarded from other content providers, but the web server module 20 also provides an administrative interface to administrators of the content-portion selection server 10, and a user interface to various features provided by the content-portion selection server 10. For example, in one embodiment of the invention the web server component 34, in conjunction with the administrative interface logic 38 facilitates web-based administration and configuration of the content-portion selection server 10. Similarly, the web server component 34, in conjunction with the user interface logic 36, facilitates web-based configuration and setup of various features of the content-portion selection services provided by the content-portion selection server 10. A storage device stores internet documents 44 associated with the user interface logic 36 and administrative interface logic 38 provided by the web server module 34

In one embodiment of the invention, the content-portion selection server 10 includes database management logic 40 for managing a data repository. Accordingly, as the content-portion selection server 10 receives portions of content and images from internet documents as such portions are selected by users, the database management logic 40 stores the content-portions in a database 42. Similarly, the database management logic 40 recalls the content-portions from the database 42, and provides the associated data to the web server module 34 so that the document can be manipulated (either at the server or at the client) in a manner that will display selected content-portions when the document is rendered by a client's web browser.

In one embodiment of the invention, the content-portion selection server 10 includes an email server 39. Accordingly, the email server 39 facilitates the generation and sending of emails by users. For example, via one or more user interface objects, a user may be prompted to enter or select an email address in order to send a copy of a currently displayed internet document—including any user-selected content-portions—to another user. The email server not only facilitates the sending of the email, but also the generation of the email and the formatting of any selected objects. Accordingly, an email recipient will receive an email with an embedded internet document showing any user selected content-portions selected by the user. The recipient need not download any special software in order to view the sent internet document and associated content-portions.

Another component of the content-portion selection server 10 is a search server 41. In one embodiment of the invention, the content-portion selection server 10 provides a search interface where users can search for relevant internet documents and content-portions. For example, a user may perform a keyword search, where the keyword is searched for in a portion of an internet document that has been previously selected by a user, or within an annotation or comments section associated with a particular content-portion. The search server 41 may facilitate searches by user or by group, such that a user can enter the name or email address of a particular user as a search parameter. Furthermore, a user may search for content based on tags—a user-assigned, relevant keyword or term associated with or assigned to a piece of information, like a picture, article, or video clip, thus describing the item. Other aspects of the various search features are described in greater detail in related U.S. patent application Ser. No. 11/766,669, entitled, "Method and System for Determining the Significance and Relevance of an Internet Document, or a Portion Thereof", filed on Jun. 21, 2007, which is hereby incorporated herein by reference.

One embodiment of the content-portion selection server 10 includes an application programming interface (API) module 37. In various configurations of the content-portion selection server, the API module provides a common interface for communicating messages with third-party add-ons, as well as software agents. For example, in one embodiment of the invention, a third-party search engine may communicate API messages to the content-portion selection server, requesting information about various documents. Accordingly, the search engine may utilize an API to communicate those messages with the content-portion selection server 10. Similarly, third-party tools and applications that utilize content-portions, and the wide variety of information and data associated with content-portions, may make requests of the content-portion selection server 10 via the API module 37.

Those skilled in the art will appreciate that various alternative components and logic may be included in a particular implementation of the content-portion selection server 10, without departing from the spirit of the invention.

User Registration

Figure 5:
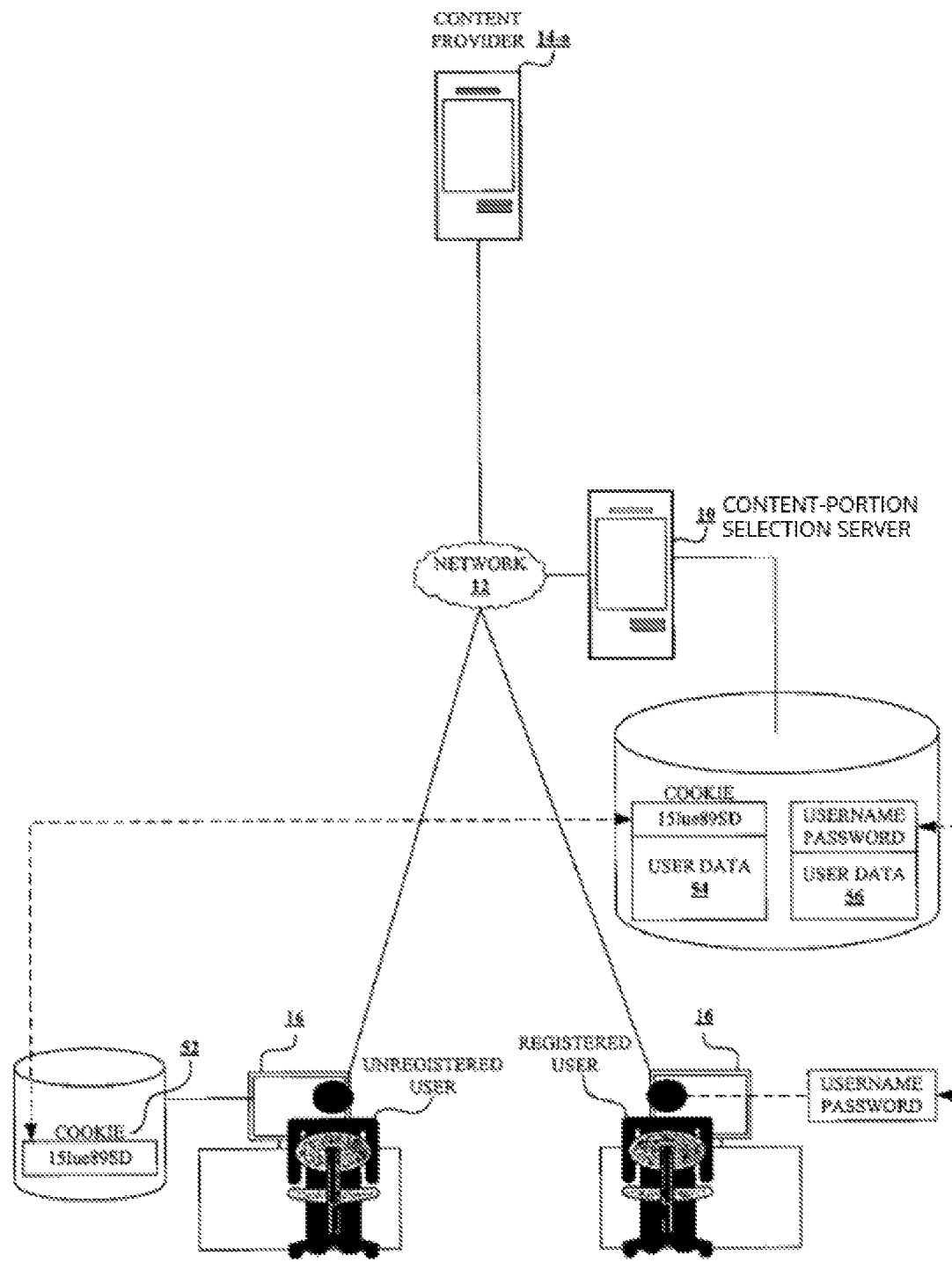
FIG. 5 illustrates an example of a registration procedure by which an unregistered user converts to a registered user, according to an embodiment of the invention.

FIG. 5 illustrates an example of a registration procedure by which an unregistered user 50 converts to a registered user 52, according to an embodiment of the invention. Advantageously, users need not download and install any customized software on a client computer in order to establish a content-portion selection session via the content-portion selection server 10. For instance, in one embodiment of the invention, asynchronous JavaScript and extensible markup language (XML), referred to as Ajax, are used to provide an interactive user experience via a conventional web browser application, without the need for downloading and permanently installing any customized software. Moreover, in one embodiment of the invention, a user need not register with the service, or establish a user account, in order to use the content-portion selection service. When a user has not registered with the service, a unique identifier 52 is sent from the content-portion selection server 10 to the client 16 executing the web browser application. The unique identifier, for example, may be an HTTP cookie that uniquely identifies the user. Accordingly, when a user selects a portion of an internet document with a content-portion selection cursor during a content-portion selection session, that portion of the document selected by the user is communicated to the content-portion selection server, associated with the unique identifier, and then stored at the content-portion selection server 10 (e.g., as user data 54 in FIG. 5). If, during a subsequent browsing session, a request is made for the same document, and the request includes the user's unique identifier, the content-portion selection server 10 will associate the selected portion of content with the unique identifier and manipulate the requested document to cause the content-portion selection(s) to display when the document is displayed in the user's web browser window. If a user decides to register with the content-portion selection service, the unique identifier (e.g. the HTTP cookie) is associated with a new human readable identifier, such as a user-selected username and password, and all previously selected content-portions will be preserved and transferred to the user's registered account, as illustrated by user data 56 in FIG. 5

User Interface (Content-Portion Selection Panel/Toolbar/Collaboration Panel)

Figure 6:
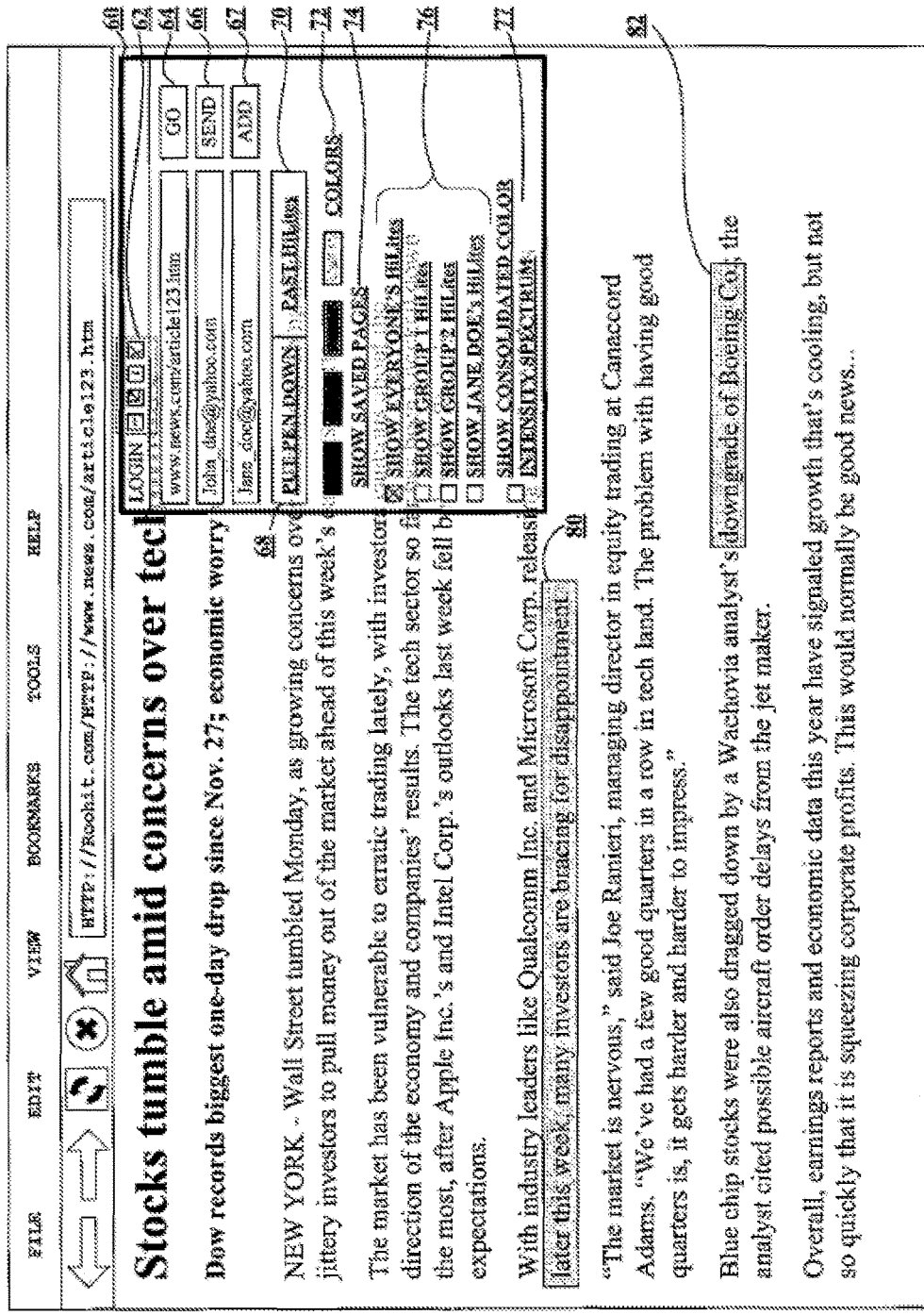
FIG. 6 illustrates an example of a user interface object, referred to herein as a content-portion selection panel, which enables a user to, among other things, select portions of content and objects on an internet document, according to an embodiment of the invention.

FIG. 6 illustrates an example of a user interface object, referred to herein as a content-portion selection tool panel 60, which enables a user to, among other things, select portions of content and objects on an internet document, according to an embodiment of the invention. According to one embodiment of the invention, the content-portion selection tool panel 60 appears as a separate window within the browser display window, and may have a variety of display modes. For instance, as illustrated in FIG. 6, the content-portion selection tool panel 60 is in maximized display mode and all controls are visible. In addition to a maximized mode, the content-portion selection tool panel 60 may also have a minimized mode. In the minimized mode, a subset of the controls may be accessible. As with conventional graphical user interface windows, a set of buttons 62 at the top of the window provide a mechanism for switching between maximized and minimized modes, and closing the tool panel window. In one embodiment of the invention, the content-portion selection panel may even have an invisible mode.

In one embodiment of the invention, the tool panel 60 includes an address bar 64 which provides a separate mechanism for navigating the World Wide Web and displaying internet documents hosted by different content providers. For instance, by typing an address in the text entry box of the address bar 64 displayed in the content-portion selection tool panel 60 and selecting the "GO" button, a user can download and display an internet document associated with the address entered. Note that the address entered in the text entry box need not include a reference to the content-portion selection service. The entered address will automatically be manipulated to invoke the content-portion selection service. If, for instance, an additional address needs to be prepended to the address entered by the user in order to invoke the content-portion selection service with the requested internet document, the content-portion selection tool panel 60 will automatically manipulate the address accordingly.

In addition to an address bar 64, in one embodiment of the invention the content-portion selection tool panel 60 includes an email address bar 66 where a user can enter an email address and share the currently displayed document, including any user-selected content-portions in the document, with another user. For example, the email address bar 66 enables a user to enter one or more email addresses, and then select the "SEND" button to instantly send an email of the currently displayed internet document. If the currently displayed document includes user-selected content-portions (e.g., selected text 80 and 82) those content-portions will be displayed with the document in the email. Advantageously, the internet document (including any content-portion selections) is embedded within an email such that the user need not install any special software in order to view the document and any included content-portion selections.

In one embodiment of the invention, the content-portion selection tool panel 60 includes a text entry box for adding a user to a list of users whose content-portions can be selectively toggled on or off. For instance, by inputting an email address (e.g., Jane_doe@yahoo.com) or username of another user in a text box, and pressing the add button 67, the user can be added to a list of users and groups 76 whose content-portions can be selectively shown or hidden. Adding a user in this manner may also add the user to one or more drop down menus, selection boxes, or scroll windows (e.g., scroll window 98 in FIG. 8) used for quickly addressing emails.

A variety of other controls may be included with the content-portion selection tool panel 60 according to an embodiment of the invention. For example, in one embodiment of the invention, the tool panel 60 includes a button (e.g., the "PUT PEN DOWN" button 68) that toggles the cursor between a standard cursor, and a content-portion selection pen cursor. When the active cursor is in content-portion selection pen mode, for example, the content-portion selection tool is active. This enables a user to select text or an object using a click and drag method, by which a user simply selects a portion of content to select by dragging across an object while depressing a cursor control (e.g., mouse) button. When the active cursor is not in content-portion selection mode, a user may select an object (e.g., a portion of text or an image) and then press a button (not shown) to select a portion of the selected content. In one embodiment of the invention, the tool panel 60 includes a button or link (e.g., the "PAST HiLites" button 70 in FIG. 6) that causes the web browser application to display a web page containing a list of past content-portion selections made by the user. The list of past content-portion selections may include a summary or excerpt from the previous selected content-portions as well as a link to the full document from which the selected content-portions are from. In addition, the past selected content-portions web page may show additional information about each content-portion, including but not limited to: the time and date the content-portion was selected, the number of people that have viewed or selected the content-portion, the address of persons with whom the user has shared the content-portion, the number of other users who have selected the object, and/or annotations made by the user.

In one embodiment of the invention, a color palette 72 is included with the tool panel 60. By selecting a color from the color palette, the user can manipulate the color of the active content-portion selection cursor, and ultimately the color of any selections the user makes. This provides each user with the ability to create customized content-portion color coding schemes. Accordingly, a user may mark-up different sections of an internet document with different colors, such that each different color indicates additional information about the selected content-portion. For instance, green selected content-portions may support a particular proposition or indicate a positive treatment of a particular subject, while red selected content-portions may indicate a negative treatment of the same subject. Those skilled in the art will appreciate the wide variety of user-customized color coding schemes that might be implemented according to an embodiment of the invention.

In one embodiment of the invention, the content-portion selection tool panel 60 includes a user/group filtering mechanism 74 which enables a user to select whose content-portion selections should be displayed in a particular internet document on a per user or per group basis. For instance, referring again to FIG. 6, by selecting the "SHOW GROUP 1 HiLites" box in the tool panel 60, all content-portion selections made by members of "GROUP 1" will be displayed to the user in the currently displayed internet document. Similarly, by selecting the "SHOW JANE DOE's HiLites" box, the user can control the display of content-portions such that Jane Doe's content-portion selections are also shown in the presently displayed document. Furthermore, in one embodiment of the invention, the filtering mechanism can be configured on a per document and/or per domain basis, such that a user can specify whose content-portion selections the user would like to see when viewing particular documents, or documents from particular domains.

In one embodiment of the invention, the content-portion selection tool panel 60 includes a configuration setting that enables the user to display content-portion selections that represent the consolidation of all user-selected content-portions on a page. For example, when the check box illustrated in FIG. 6 next to the option "SHOW CONSOLIDATED COLOR INTENSITY SPECTRUM" with reference 77 is checked, the content-portion selection service will analyze all of the user-selected content-portions associated with a particular internet document or web page. Rather than show individual content-portions, the content-portion selection service causes portions of the internet document to be selected in particular colors that represent the frequency with which that portion of the document has been selected. For example, when the check box 77 is selected, a portion of the document that has been selected by many users may be shown in red. Accordingly, under this scenario, a red content-portion on a particular object indicates that the particular object has been selected by many users. A less frequently selected portion of the document may be selected in another color. In another embodiment, the particular shade of the color may indicated the frequency with which the portion of the document has been selected. In one embodiment of the invention, enabling the color intensity spectrum view of content-portions automatically disables the user/group view of content-portion selections. That is, when viewing content-portions in the color intensity spectrum mode, user level content-portion selections and/or group level content-portion selections may not be shown.

Many of the configuration settings illustrated in FIG. 6 may also be accessed and adjusted via a content-portion selection web portal. For example, the content-portion selection service provides a web-based user interface where users can set certain configuration parameters to default settings. Accordingly, when a user invokes the content-portion selection service without the content-portion selection tool panel, any configuration settings previously established via the content-portion selection web portal will be active by default.

FIG. 7 illustrates an example of a user interface object, referred to herein as a content-portion selection toolbar 78, which enables a user to, among other things, select portions of content and objects on an internet document, according to an embodiment of the invention. Similar to the content-portion selection tool panel 60 illustrated in FIG. 6, the content-portion selection toolbar 78 is a user interface object that provides a variety of controls and features associated with the content-portion selection service. In one embodiment of the invention, the content-portion selection toolbar includes the control objects described above in connection with the content-portion selection tool panel 60, including but not limited to: an address bar for navigating, an email address bar for sharing the currently displayed document with any user-selected content-portions, a button to toggle the active content-portion selection cursor on and off, a button to access previously selected content-portions, a button to access previously saved pages, a color palette to change the color of selected content-portions, and a mechanism for selecting and filtering the content-portion selections that are displayed on an internet document on a per user or per group basis. In addition, in one embodiment of the invention, the toolbar may include third-party tools. For example, the toolbar may provide one or more control objects enabling the user to quickly and easily gain access to a third-party tool, service, or application.

Figure 8:
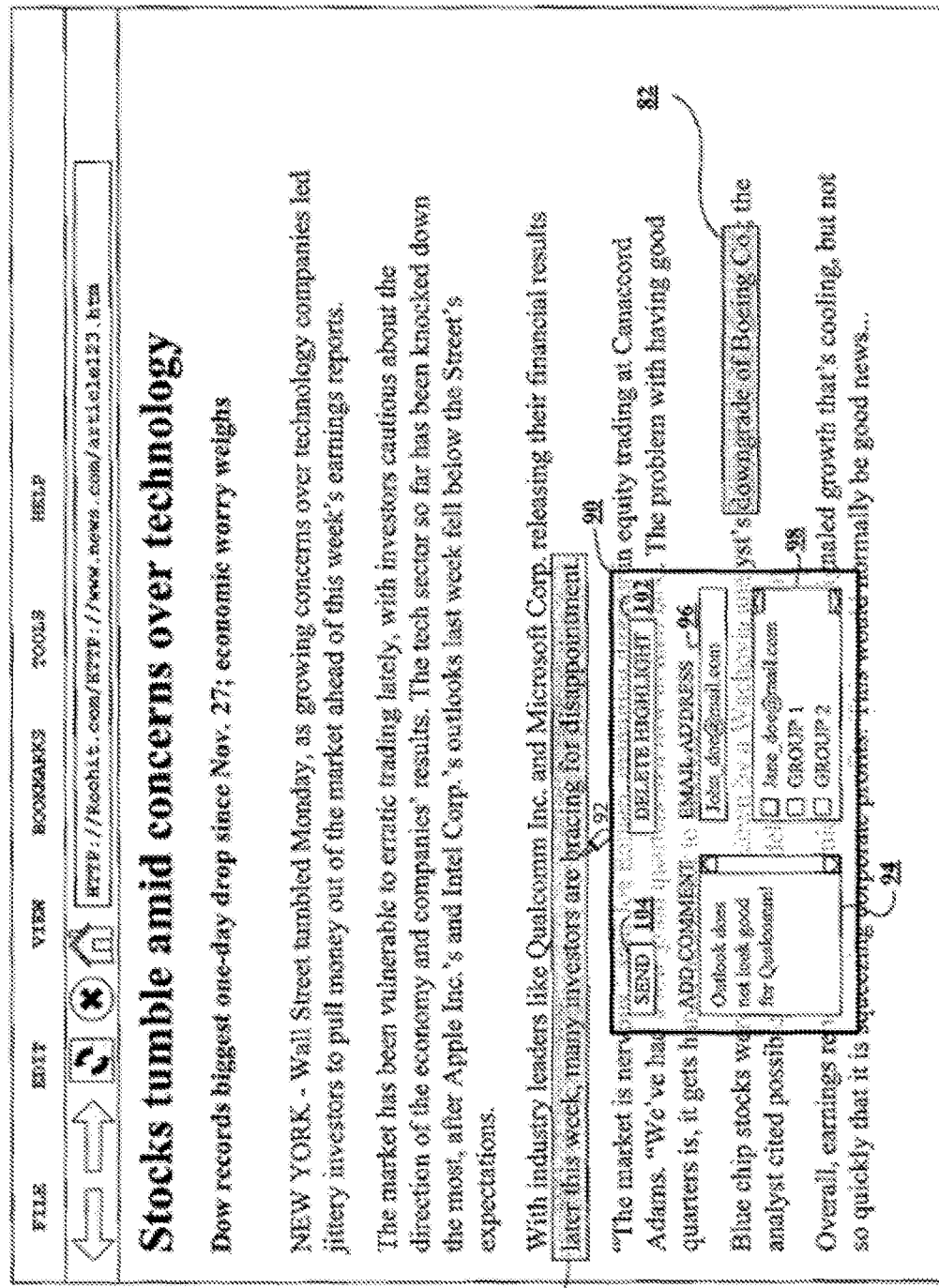
FIG. 8 illustrates an example of a user interface object, referred to herein as a collaboration panel, which enables a user to share an internet document containing user-selected content-portions with another user, according to an embodiment of the invention.

FIG. 8 illustrates an example of a user interface object, referred to herein as a collaboration panel 90, which enables a user to share an internet document containing user-selected content-portions with another user, according to an embodiment of the invention. As illustrated in FIG. 8, in one embodiment of the invention the collaboration panel 90 is a mouseover window or box that appears when a user moves the content-portion selection cursor 92 over a particular selected content-portion 80 in the currently displayed internet document. The collaboration panel 90 includes a text entry box 94 where a user can provide a comment about the particular selected object. In addition, the collaboration panel 90 includes an email address bar 96 where the user can enter one or more email addresses. Also, the collaboration panel includes a scroll window 98 with a list of other users and groups with whom the user may be associated. By checking a box, or otherwise selecting another user or group, the user can quickly address an email to the user or group. After selecting and/or entering the names of those persons/groups to receive an email, the user simply selects the "SEND" button 100 to send a copy of the currently displayed internet document, including any selected objects (e.g., content-portions 80 and 82), embedded within an email. In one embodiment of the invention, the email server 39 of the content-portion selection server 10 will generate and send the email to the selected recipients. Accordingly, the recipient of such an email will be able to view the entire internet document including any content-portion selections without downloading any additional software and/or requesting any additional internet documents. In an alternative embodiment of the invention, a link to a selected document may be provided in the email. In other embodiments of the invention, the sharing of content-portions may be done using SMS, text, or some other form of messaging.

In one embodiment of the invention, the collaboration panel also provides a view of any comments that a user may have entered about a particular selected content-portion. For instance, if a user sends a comment to another user, the other user may view the comment by simply putting the content-portion selection cursor over the selected content-portion. If more than one comment is associated with a particular selected content-portion, the comments will be displayed in order such that a user can follow along with a virtual conversation based on an exchange of comments. Just as a user may filter the selected content-portions that are displayed, in one embodiment of the invention, comments may optionally be filtered so that a user only sees comments from particular users, or groups, of interest.

Figure 9:
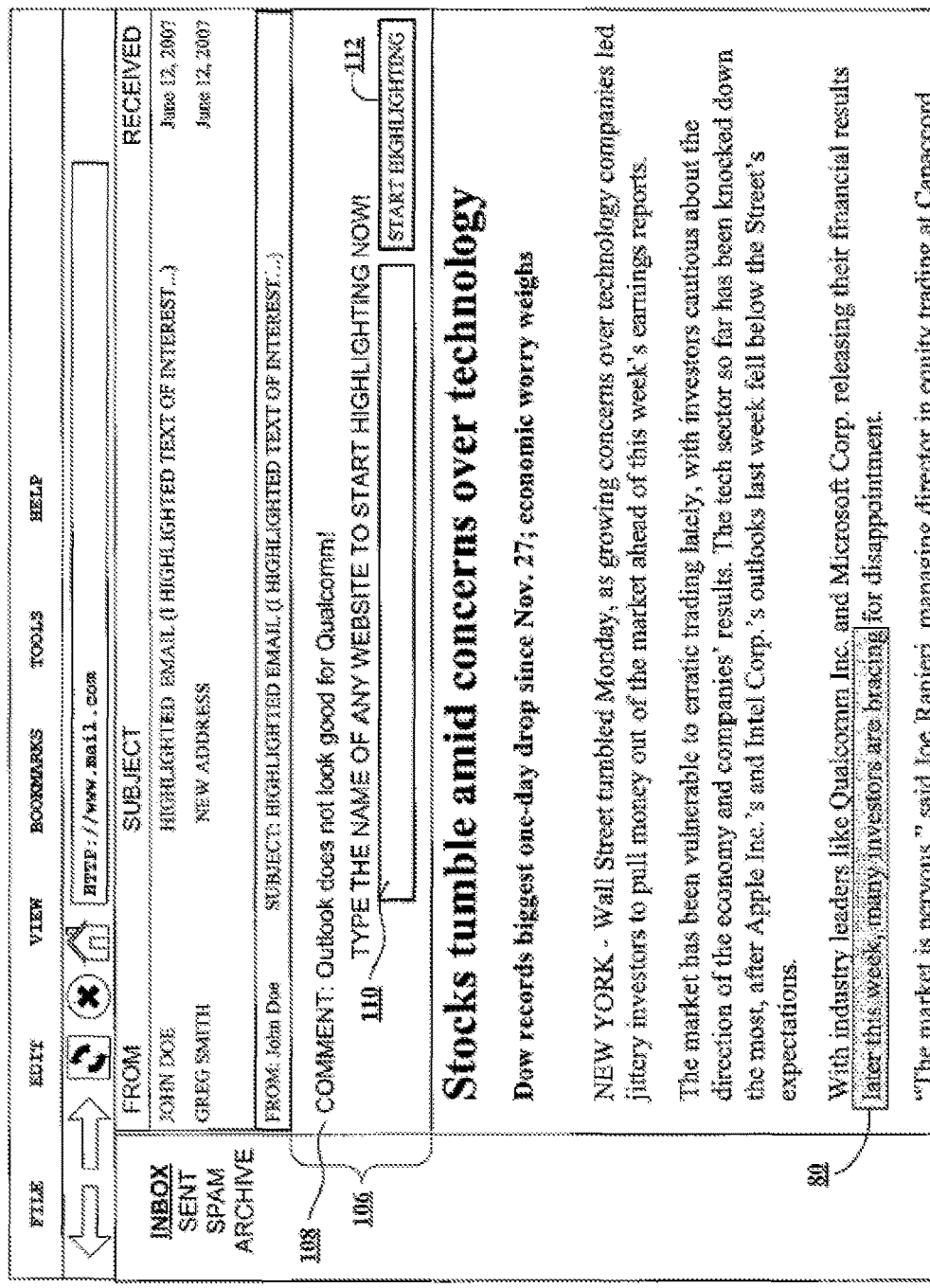
FIG. 9 illustrates an example of an email with user-selected content-portions, according to an embodiment of the invention.

FIG. 9 illustrates an example of an email with user-selected content-portion selections, according to an embodiment of the invention. As illustrated in FIG. 9, an email generated and sent via the collaboration panel includes a header portion 106 where the comment 108 that was entered in the text box 94 of the collaboration panel 90 is displayed. This provides the recipient of the email with additional information and context as to what is relevant about the document as a whole, and the selected content-portion 80 in particular.

In one embodiment of the invention, the header portion 106 of the email also includes an address bar 110, where a user can enter the address or URL of a web site or document, and begin a content-portion selection session. For instance, by entering a URL in the address bar 110 of the email, and then pressing the "START HiLiting" button 112, a web browser window will open and the requested document will be displayed along with a content-portion selection tool panel 90.

Content-Portion Selection Web Portal

Figure 10:
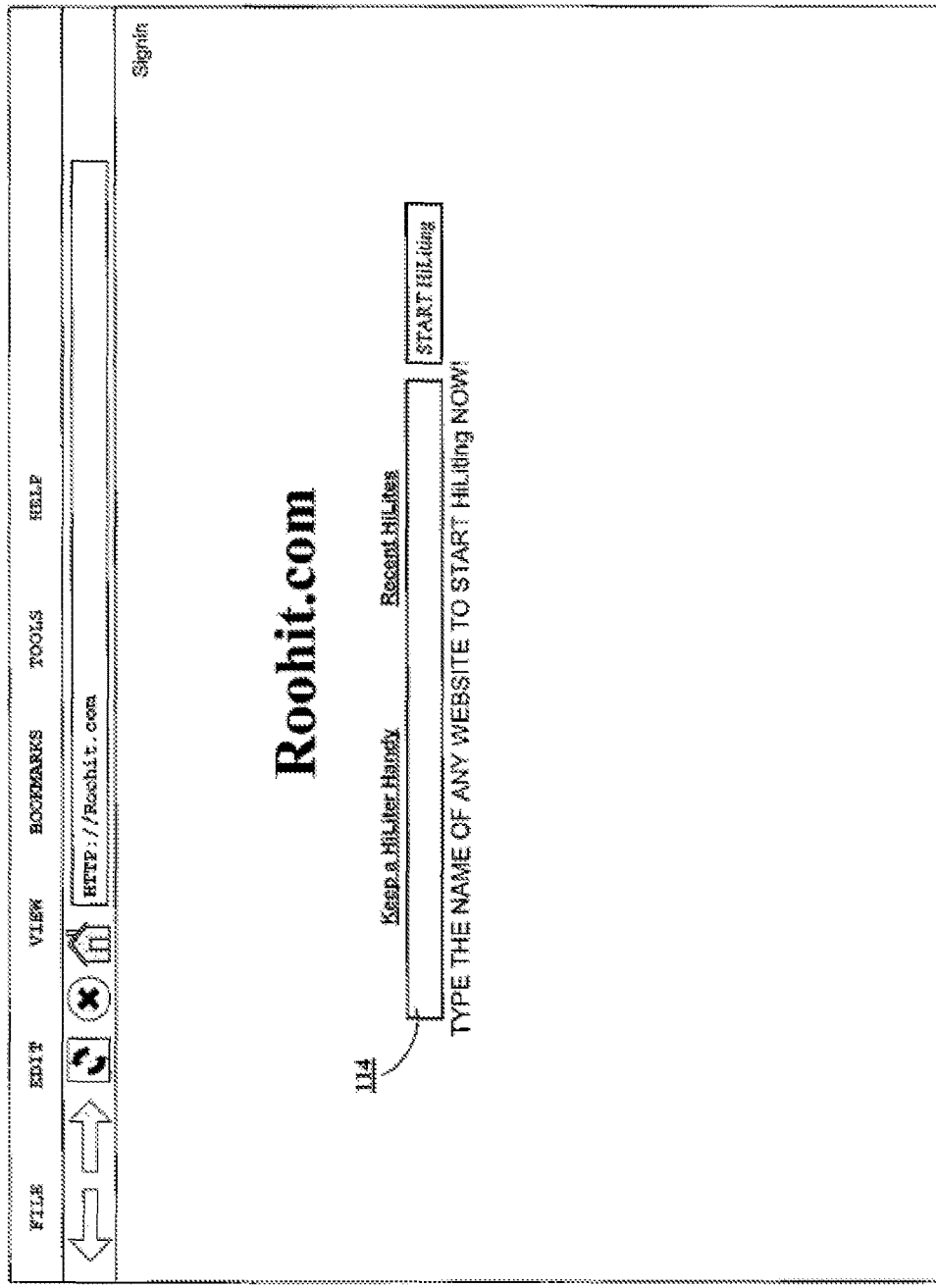
FIGS. 10 through 12 illustrate various user interface features of a content-portion selection web portal, according to an embodiment of the invention.

FIG. 10 illustrates a top level page (e.g. a home page) for a content-portion selection web portal, according to an embodiment of the invention. As illustrated in FIG. 10, in one embodiment of the invention, the home page of a content-portion selection web portal includes a text entry box 114 where a user can enter a URL or document address to begin a content-portion selection session. For example, by simply typing in the address of an internet document in the text entry box 114 and then pressing the "START HiLiting" button, a user invokes a content-portion selection session with the document corresponding with the address entered.

Figure 11:
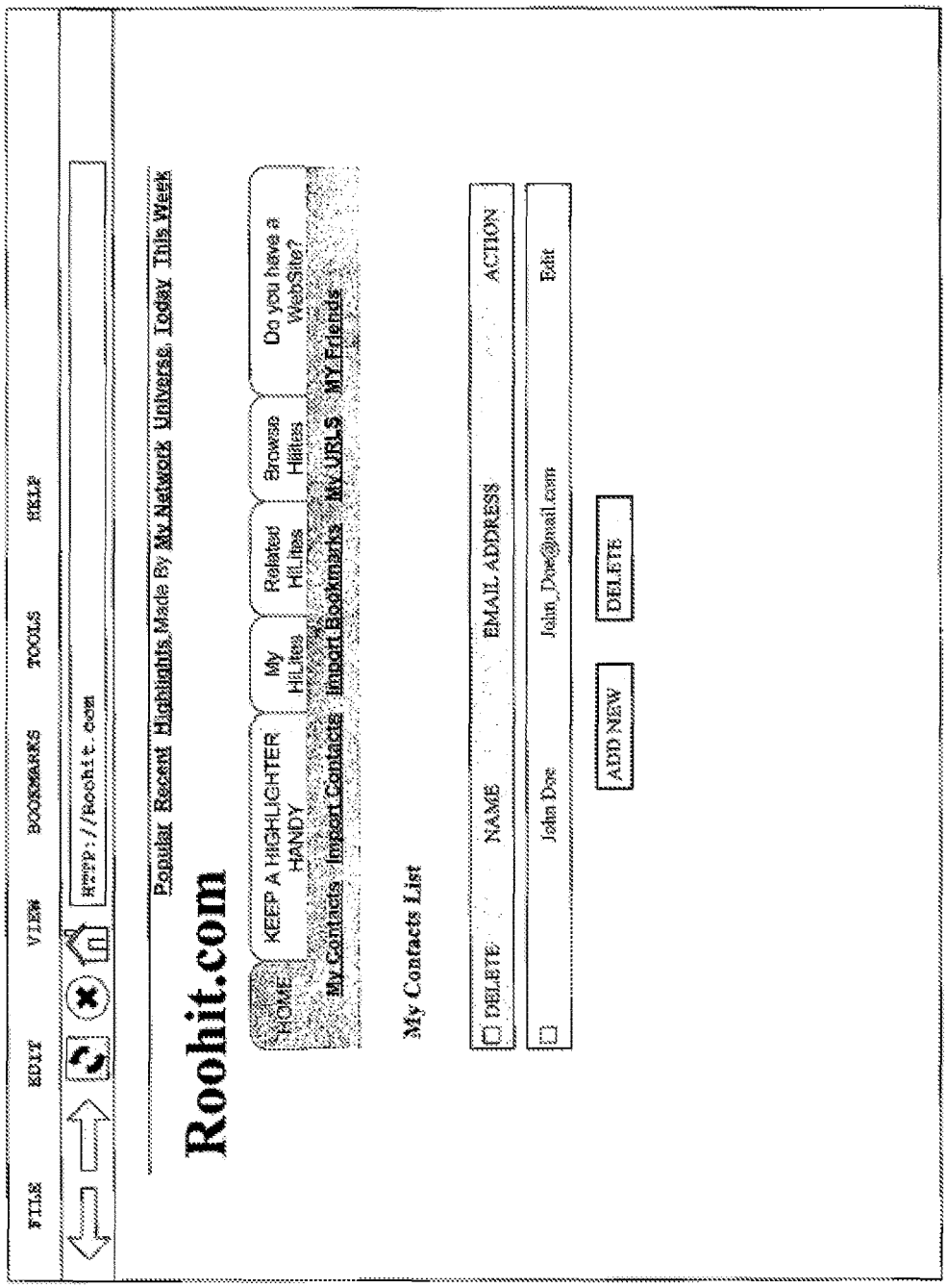

FIG. 11 illustrates a contact management page of a content-portion selection service, according to an embodiment of the invention. As illustrated in FIG. 11, in one embodiment of the invention, the content-portion selection service includes a contacts list where a user can enter and maintain personal and/or business contact information. In one embodiment, as a user shares selected content-portions via email, the email addresses of the recipients will automatically be saved into the user's contact list. In addition, as users are added as contacts, the email addresses of those users will automatically populate certain user interface objects, such as the scroll window 98 in FIG. 8. In other embodiments of the invention, the sharing of content-portions may be done using SMS, text, or some other form of messaging, and in a similar manner recipients can be added to the sending user's contact list.

In one embodiment of the invention, the contact management interface may also provide a mechanism for users to build out or define a social network. For example, a user may specify which contacts to include in his or her social network. Accordingly, several of the features described herein may be configured on the basis of one's social network. For example, a user may select to see all selected content-portions from any member within his social network.

Figure 12:
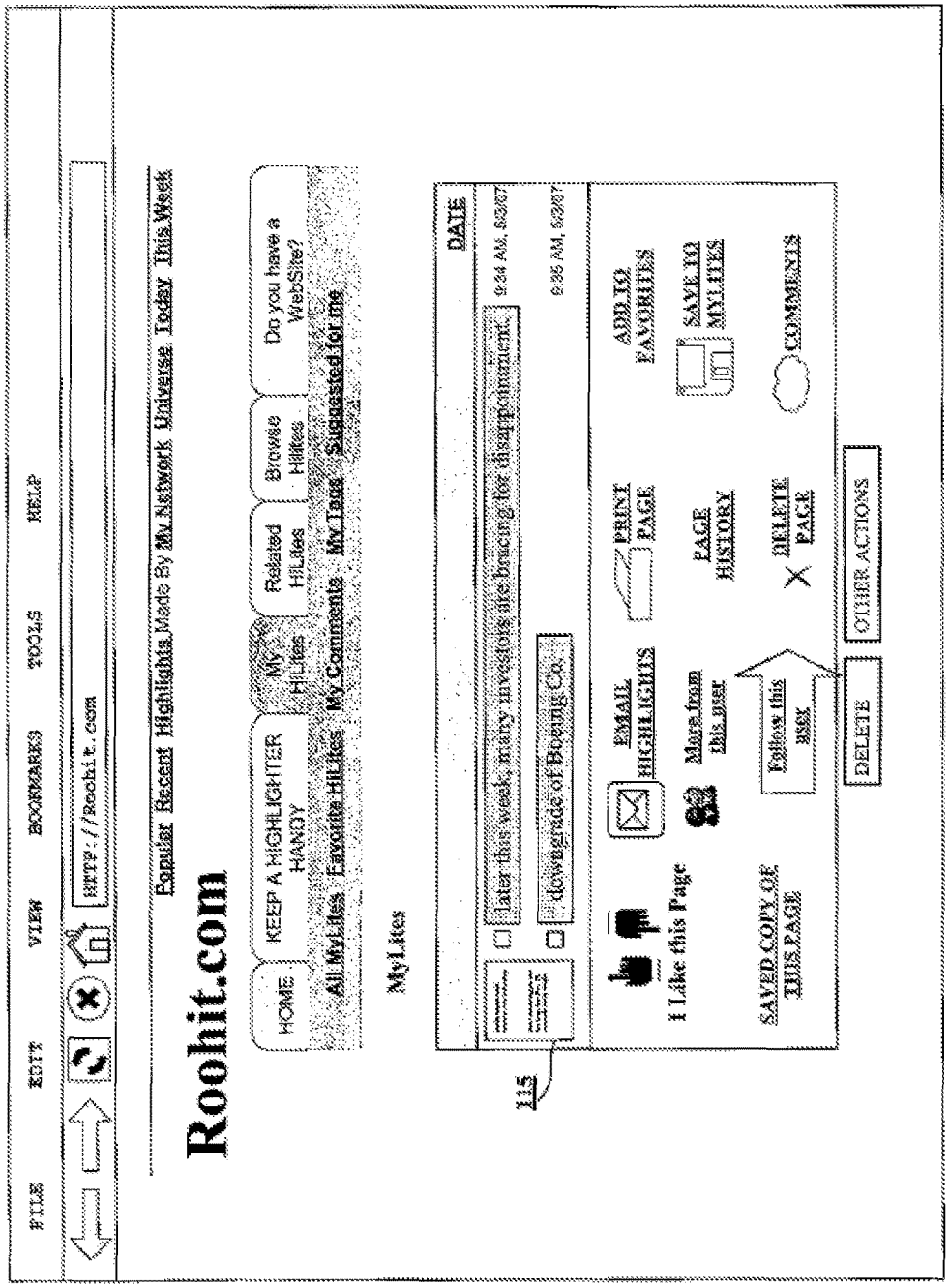

FIG. 12 illustrates a HiLites summary page, according to an embodiment of the invention. In one embodiment of the invention, a content-portion selection web portal provides the user with easy access to a list of all previously selected content-portions of a particular user (including oneself). In addition to showing a thumbnail 115 of the document which the selected content-portions are from, the list also includes a variety of links/icons enabling the user to take several actions in connection with a selected content-portion, or a comment associated with a selected content-portion. For instance, a user may rank or rate a selected content-portion, a comment, and/or an internet document containing a selected content-portion or comment. In one embodiment, a user may select a link to see more selected content-portions or comments from a particular user. In addition, the user may select a button or link enabling the user to subscribe to a particular user's content-portion selection activities. Accordingly, as the particular user makes new content-portion selections, a copy of such content-portions and/or the internet document containing the selected content-portions may be sent to the user in near real-time, or on a predetermined or user-configured periodic schedule.

Figure 13:
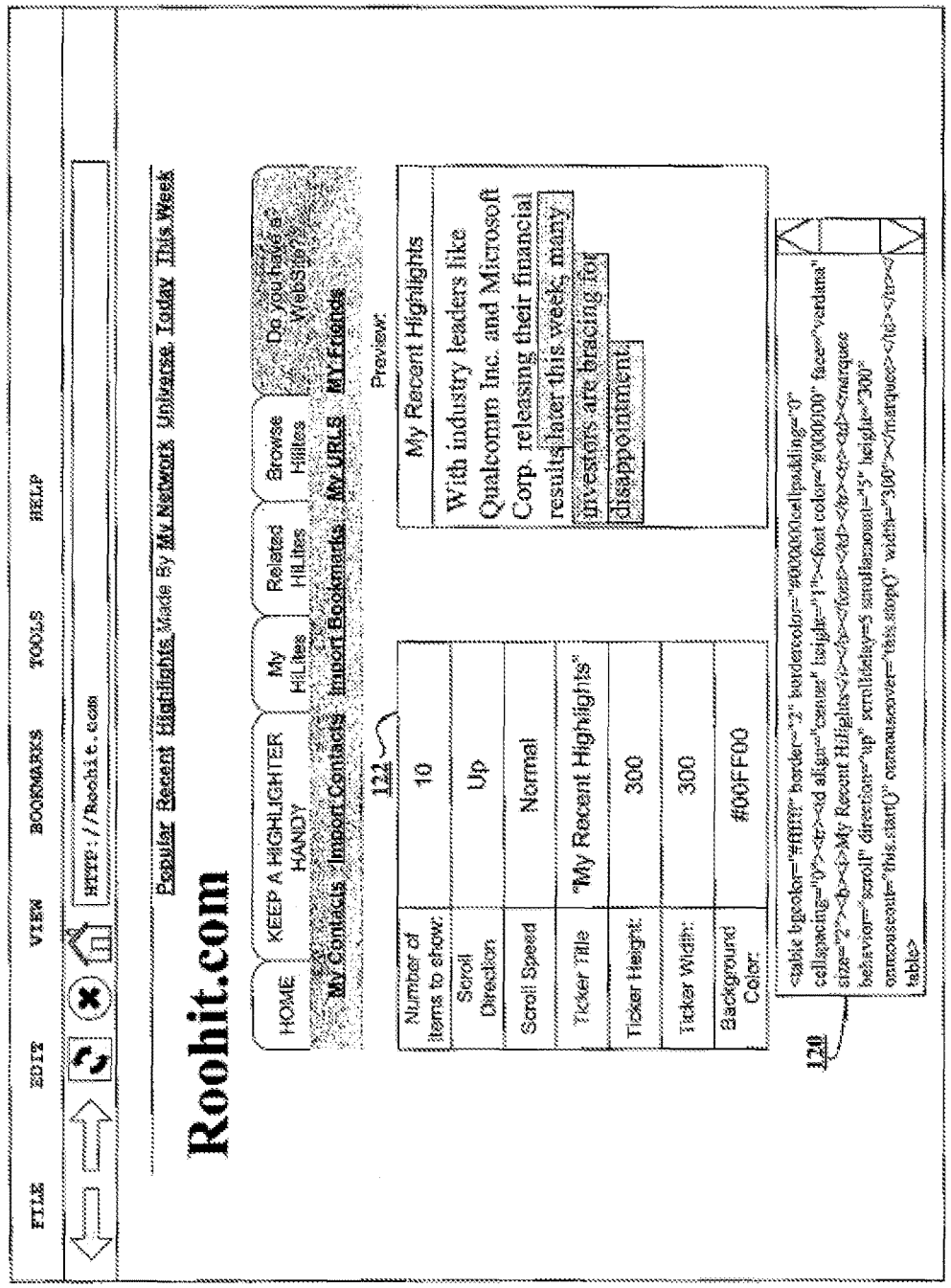
FIG. 13 illustrates an example of a web page providing a snippet of code for adding a content-portion selections roll to a web page, according to an embodiment of the invention.

FIG. 13 illustrates an example of a web page providing a snippet of code 120 for adding a user interface object, referred to herein as a content-portion selections roll, to a third-party web page, according to an embodiment of the invention. The snippet of code shown in FIG. 13 can easily be added to another web page by copying and pasting the code. The content-portion selections roll, once embedded in another web page, will display content-portions of a particular user. The code snippet 120 is generated automatically in response to user-specified parameters 122 that are provided at one or more user interface input mechanisms (e.g., drop down lists, text entry boxes, and so on). Accordingly, the content-portion selections roll can be configured to show a particular number of previous selected content-portions, scroll selected content-portions up or down, scroll at variable speeds, and display the selected content-portions in various user-selected formats. In one embodiment of the invention, the content-portion selections roll may query the content-portion selection service to receive a predetermined number of the most recent selected content-portions by a user, by a group, or by everyone, or based on a particular topic, or by a grouping of particular websites or URLs. By inputting various configuration parameters, a user can display a preview of what the content-portion selection roll will look like when embedded in a third-party web page.

FIG. 14 illustrates an example of a web page with a user interface object referred to herein as a content-portion selections roll 126, according to an embodiment of the invention. As described in connection with FIG. 13, the code for displaying a content-portion selections roll 126 may be automatically generated by a content-portion selection service web portal, such that a blogger or another web author can easily copy and paste the code into his or her own web page, thereby adding the content-portion selections roll 126 to his or her web page and enabling the display of user-selected content-portions. As illustrated in FIG. 14, the content-portion selections roll has a title, "JANE DOE'S HIGHLIGHTS:" as well as a box 126 where selected content-portions are displayed. The title is easily configurable by providing a configuration parameter as described in connection with FIG. 13. In various embodiments of the invention, multiple content-portion selections may scroll up or down in the box. In one embodiment of the invention, the selected content-portions will automatically and dynamically update as a user continues to select content-portions on new internet documents. Accordingly, a content-portion selections roll 126 provides an excellent means of displaying a user's recent web activity, to the extent that a user's content-portion selection activity represents his or her web activity. A content-portion selections roll may be particularly useful on blogging websites, but also on news websites, corporate websites, social networking websites, and others.

In one embodiment of the invention, a query is used to select the particular content-portions from a content-portion selection service that are to be displayed in a content-portion selections roll. Accordingly, the selection parameters for the query may be configured by a user, such that a wide variety of content-portion characteristics can be used to select the particular content-portions to be displayed in a content-portion selections roll. In one embodiment of the invention, a content-portion selections roll may be configured to display selected content-portions from a particular user, or group of users. In another embodiment, the content-portion selections roll may be configured to randomly query the content-portion selection service for user-selected content-portions. In yet another embodiment, the content-portion selections roll may be configured to query the content-portion selection service for content-portions that were made on a particular internet document, website, or group of websites. In another embodiment of the invention, the content-portion selections roll may be configured to query the content-portion selection service for content-portions that contain a particular key word or words. In yet another embodiment, the content-portion selections roll may be configured to query the content-portion selection service for content-portions of images.

In one embodiment of the invention, a content-portion selections roll may be used on a blog website. For example, a blogger may use a content-portion selections roll to enhance the content on his or her blog site. Alternatively, the content-portion selections roll may take the place of a blog altogether. For example, by displaying a content-portion selections roll in place of a blog, a user may author blog entries by simply content-portion selection portions of other internet documents, and then providing comments about the selected portions of the document. Those skilled in the art will appreciate that a content-portion selections roll may be used in other contexts not specifically addressed herein.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as a set of instructions stored on a computer-readable medium. The scope of the invention is defined by the claims and their equivalents.

What is claimed is:

1. A computer-implemented method, comprising:
on a computer with at least one processor,
providing one or more user input mechanisms, wherein the user input mechanisms identify one or more content portions and a manner in which the one or more content portions will be displayed in a first web page,
automatically generating a code snippet for a user interface object to be embedded in the first webpage, wherein the code snippet is generated based on the one or more user inputs, and wherein the code snippet is embedded in the first web page,
wherein the code snippet is configured to cause querying a service to select content portions for the one or more content portions extracted from other web content,
wherein the service to select content portions is coupled to a computer readable storage medium, and
wherein the one or more content portions being identified responsive to the query are one or more content portions stored previously by one or more users of the service to select content portions, and
displaying the identified one or more content portions, or a representation of the one or more content portions, within the user interface object embedded on the first web page.

2. The computer implemented method of claim 1, wherein following embedding the code snippet in the first webpage:
the code snippet periodically causing querying the service to select content portions for additional associated information or additional content portions; and
upon receiving the additional associated information, or additional content portions,
displaying the additional associated information, or additional content portions in the user interface object embedded in the first web page; or displaying a representation of the additional associated information, or additional content portions, in the user interface object embedded in the first web page.

3. The computer-implemented method of claim 1, wherein, in addition to the content portions, or a representation of the content portions:
the user interface object displays
(i) information associated with the content portions,
(ii) a URL the selections were made on, and/or
(iii) users who selected the content portions.

4. The computer-implemented method of claim 1, wherein the code snippet:
is configured to cause querying the service to select content portions for content portions that satisfy specific parameters, and
the user interface object embedded on the first web page is configured to display
(i) content portions, and/or
(ii) a representation of the content portions, and/or
(iii) associated objects having characteristics that satisfy the specific parameters.

5. The computer-implemented method of claim 1, wherein the content portions, or a representation of the content portions, as displayed by the user interface object embedded on the first web page:
comprise links, thereby enabling a user to retrieve a document associated with the selected content portion by interacting with the user interface object embedded on the first web page.

6. The computer-implemented method of claim 1, wherein the user interface object embedded on the first web page displays one or more of:
(i) a link to information associated with a content portion,
(ii) a document containing the content portion,
(iii) a user who selected the content portion.

7. The computer-implemented method of claim 1, wherein the code snippet that causes querying the service to select content portions:
(i) is editable, and/or
(ii) user-configurable from a web page, and/or
(iii) controls characteristics of the user interface object embedded on the first web page.

8. The computer-implemented method of claim 1, wherein the first web page on which the user interface object is embedded: is hosted on a first server different from a second server hosting the service to select content portions.

9. The computer-implemented method of claim 1, further comprising:
enabling a user of the first web page to associate additional information with the content portion.

10. The computer-implemented method of claim 1, wherein the content portion, or a representation of the content portion:
as displayed by the user interface object embedded on the first web page, comprises a link to direct users to specific locations of the Internet.

11. A computer-implemented method for displaying content portions of web pages, comprising executing on a processor the steps of:
presenting a first web page of a first website for configuring, through one or more user input mechanisms, a user interface object to be displayed on a second webpage of a second website,
receiving the one or more user inputs, wherein the user inputs identify one or more content portions and a manner in which the one or more content portions will be displayed, and configuring the user interface object accordingly,
automatically providing a code snippet for the user interface object to be embedded in the second webpage, wherein the code snippet is generated based on the one or more user inputs, and wherein the code snippet is embedded in the second web page,
wherein the code snippet is configured to cause querying a service to select content portions for the one or more content portions extracted from other web content,
wherein the service to select content portions is coupled to a computer readable storage medium, and
wherein the one or more content portions being identified responsive to the query are one or more content portions stored previously by one or more users of the service to select content portions, and
displaying the identified one or more content portions, or a representation of the one or more content portions, within the user interface object embedded on the second web page.

12. The computer-implemented method of claim 11, wherein, in addition to being configured to display the content portions within the second web site, the user interface object is configured to display one or more of:
(i) information associated with the content portions,
(ii) the URL the content portions were selected from,
(iii) the users who selected the content portions.

13. The computer-implemented method of claim 11, wherein presenting a first web site for configuring a user interface object to be displayed on a web page of a second web site includes
enabling configuration of the user interface object without having to manually edit any code hosted at the second web site.

14. The computer-implemented method of claim 11, wherein
the first web site provides a mechanism by which a user can establish search parameters for use by the code that causes querying the service to select content portions for matching content portions.

15. The computer-implemented method of claim 14, wherein the search parameters include:
source of a selection, range of time during which a selection was made, origin of document where the selection was made, selection containing specific keywords, privacy levels, comments sources, total number of selections to be selected for display or minimum or maximum rating associated with a selection.

16. The computer-implemented method of claim 11, wherein the first web site provides
a mechanism by which a user can configure display parameters that determine the display characteristics of the user interface object, the content portions or associated data displayed by the user interface object.

17. The computer-implemented method of claim 11, wherein the code periodically causes querying the service to select content portions for additional content portions, and upon receiving the additional content portions, displaying the content portions in the user interface object.

18. A system to display content portions, the system comprising a computer with at least one processor and coupled to a memory storing instructions, executing via the processor the steps of:
providing one or more user input mechanisms, wherein the user input mechanisms identify one or more content portions and a manner in which the content portions will be displayed in a first web page,
automatically generating a code snippet for a user interface object to be embedded in the first webpage, wherein the code snippet is generated based on the one or more user inputs, and wherein the code snippet is embedded in the first web page,
wherein the code snippet is configured to cause querying a service to select content portions for the one or more content portions extracted from other web content,
wherein the service to select content portions is coupled to a computer readable storage medium, and
wherein the one or more content portions being identified responsive to the query are one or more content portions stored previously by one or more users of the service to select content portions, and
displaying the identified one or more content portions, or a representation of the one or more content portions, within the user interface object embedded on the first web page.

19. The system of claim 18, wherein the code snippet has been configured to customize:
i) the display characteristics of the user interface object displayed on the first web page, and/or
ii) the content portions to be selected for display in the user interface object.

20. The system of claim 18:
wherein the user interface object comprises functionality to enable a visitor to get additional information associated with the content portion, and
wherein the user interface object comprises at least one link to attract more users to specific locations on the Internet.

* * * * *